Feb. 16, 1926.

L. E. ZERBE 1,573,216

PULLEY SUPPORT FOR CROWN BLOCKS

Filed May 19, 1925

Inventor
Lewis E. Zerbe.
By Lyon & Lyon
Attorneys.

Patented Feb. 16, 1926.

1,573,216

UNITED STATES PATENT OFFICE.

LEWIS E. ZERBE, OF MONETA, CALIFORNIA, ASSIGNOR TO UNION TOOL COMPANY, OF TORRANCE, CALIFORNIA, A CORPORATION OF CALIFORNIA.

PULLEY SUPPORT FOR CROWN BLOCKS.

Application filed May 19, 1925. Serial No. 31,347.

*To all whom it may concern:*

Be it known that I, LEWIS E. ZERBE, a citizen of the United States, residing at Moneta, in the county of Los Angeles and State of California, have invented a new and useful Pulley Support for Crown Blocks, of which the following is a specification.

This invention relates to pulley support of the character employed in crown blocks for drilling oil wells, and an object of the invention is to provide a construction that will avoid weakening the shaft.

The prior practice has been to flatten the shaft on its underside at its opposite ends and these flattened faces rest directly upon beams of the crown block. This cutting of the shaft in this manner weakens it and I avoid this by resting the shaft on bearings and providing a cap with an internal shoulder adapted to seat upon the flattened face of recesses cut in the upper side of the shaft at the ends thereof.

A further object is to provide a construction that will permit of the bearing block being made relatively short. This is important, especially when extremely large pulleys are employed in the crown block, since the shorter the pulley supports are the closer together may pulleys of a given diameter be adjusted.

The accompanying drawings illustrate the invention:

Figure 1:
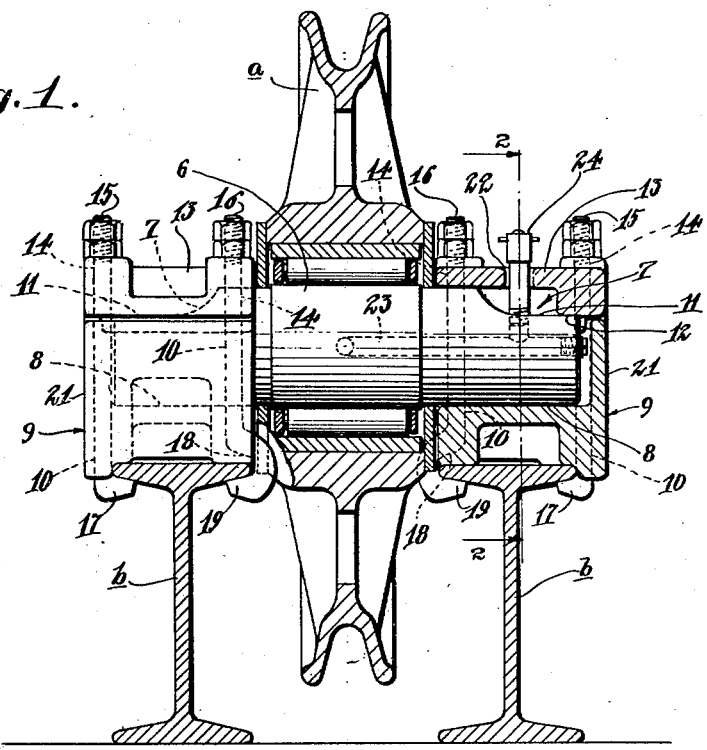
Fig. 1 is an elevation, partly in section, of a pulley support embodying the invention, a pulley and a pair of beams of the crown block also being shown in section.
Figure 2:
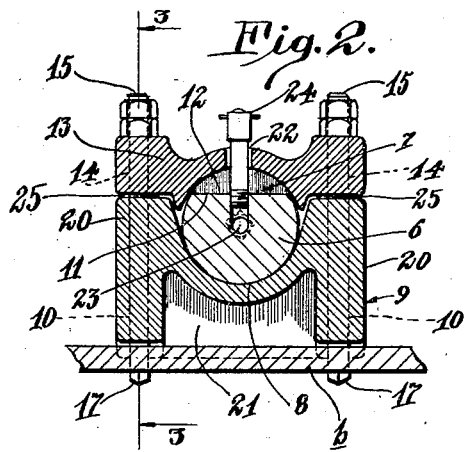
Fig. 2 is a sectional elevation on the line indicated by 2—2, Fig. 1.
Figure 3:
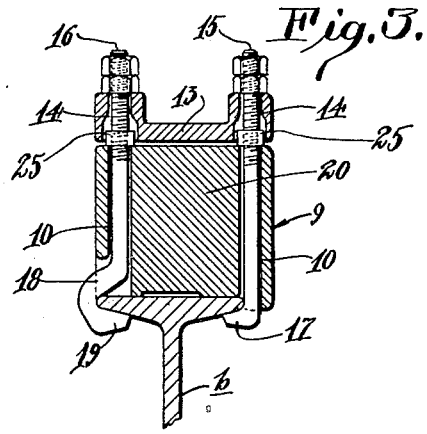
Fig. 3 is a sectional elevation on the line indicated by 3—3, Fig. 2.

There is provided a shaft 6 on which is rotatably mounted a pulley *a* which does not constitute a portion of the present invention. The shaft 6 is provided with recesses 7 in its upper face at its opposite ends and the end portions of said shaft rest in concave seats 8 formed in a bearing 9. The bearings 9 are adapted to rest upon the upper face of the upper flanges of I-beams *b* of the crown block and each bearing 9 is provided with four vertical bolt holes 10.

Engaging the flat horizontal faces 11 of the recesses 7 are internal shoulders 12 of caps 13 which are spaced at all points from the bearings 9 so as to securely clamp the shaft in said bearings. Each cap 13 is provided with bolt holes 14 which register with the bolt holes 10. Through the bolt holes 14, that are nearest the outer ends of the support, pass bolts 15 and through the bolt holes 10, 14, that are near the inner ends of the members 9, 13, extend bolts 16. The bolts 15 are straight with the exception of being provided at their lower ends with laterally extending shoulders 17 to engage beneath the upper flanges of the I-beams *b*. The bolts 16 have arched portions near their lower ends 18. The lower ends of the bolts 16 have shoulders 19 that engage beneath the upper flanges of the I-beams.

The upper faces of the side walls 20 of each of the bearings 9 are substantially flush with the recess faces 11, and the end wall 21 of each bearing extends up past the adjacent outer end of the shaft to cover the same.

By the foregoing described construction the bearing block for the shaft may be made relatively short and the pulley hub relatively long as the bolts 16 will not interfere with the hub of the pulley. This is an advantage when using extremely large pulleys in the crown block as the shorter the bearing blocks are the closer together may pulleys of a given diameter be adjusted on the crown block.

From the foregoing it will be seen that the bearings 9 and caps 13 can be shifted to any desired position along the I-beams and then secured in such position by tightening the bolts 15, 16, thus making it convenient for positioning the pulley *a* in relation to the other pulleys of the crown block.

In order to provide the pulley *a* with a lubricant, the shaft 6 is provided with a duct 23 which opens to the flat bottom face 11 of one of the recesses and which communicates with a filling nipple 24 that projects through the hole 22 in one of the caps 13.

The foregoing will make clear the construction and operation of the invention, for it is well known in this art that the casing line is placed on the pulley *a* to effect lowering and elevating of the well casing.

In the instance shown in the drawings I provide safety collars 25 on the bolts 15, 16 in the form of circular nuts screwed down upon the upper faces of the bearing blocks 9, as disclosed in my prior Patent No. 1,506,105, granted August 26, 1924.

I claim:

1. A pulley support for a crown block, comprising a shaft having recesses in the upper side at its opposite ends, bearings having concave seats for the shaft to rest in and having bolt holes, caps provided with internal shoulders engaging in the recesses, said caps having bolt holes registering with the first mentioned bolt holes, and bolts extending through the bolt holes and having shoulders to engage beneath the flanges of I-beams on which the bearings rest.

2. A pulley support for a crown block, comprising a shaft having recesses in its upper side at its opposite ends, bearings having concave seats for the shaft to rest in and having bolt holes, the outer end walls of the bearings extending up past the outer ends of the shaft, and caps provided with internal shoulders engaging in the recesses, said caps having bolt holes registering with the first mentioned bolt holes, and bolts extending through the bolt holes and having shoulders to engage beneath the flanges of I-beams on which the bearings rest.

3. A pulley support for a crown block, comprising a shaft having recesses in the upper side at its opposite ends, bearing blocks having concave seats for the shaft to rest in and having bolt holes, caps provided with internal shoulders engaging in the recesses, said caps having bolt holes registering with the first mentioned bolt holes, and bolts having straight portions extending through the bolt holes and having shoulders to engage beneath the flanges of I-beams on which the bearing blocks rest, some of said bolts having arched portions near their lower ends to extend around the inner edges of the upper flanges of the I-beams to cause the straight portions of said bolts to lie above the I-beams.

Signed at Torrance, California, this 11th day of May, 1925.

LEWIS E. ZERBE.